May 25, 1937.  S. L. JOINER  2,081,457
ATTACHMENT FOR AIR BRAKE PRESSURE RETAINING VALVES
Filed March 12, 1934   2 Sheets-Sheet 1
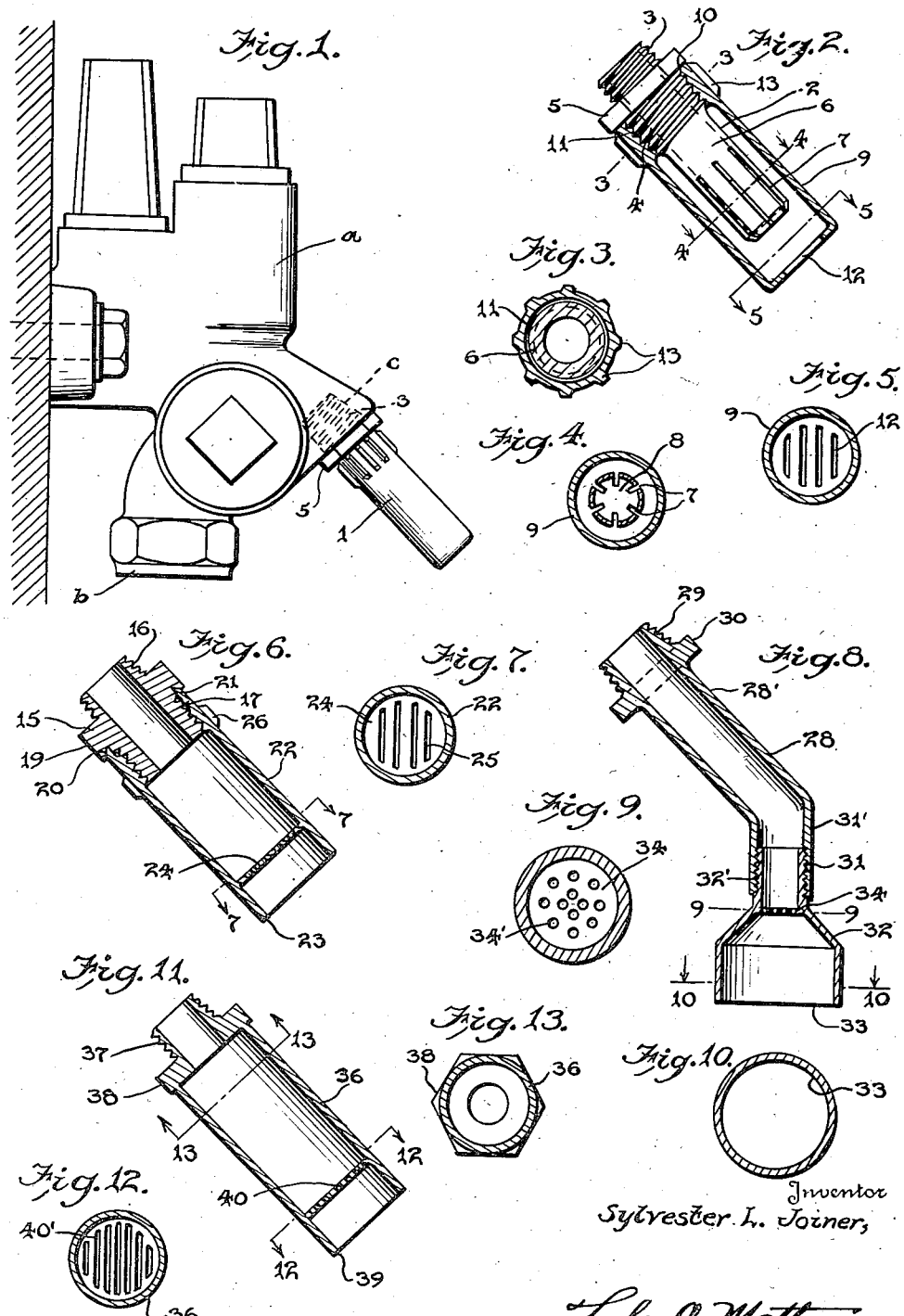

May 25, 1937.  S. L. JOINER  2,081,457
ATTACHMENT FOR AIR BRAKE PRESSURE RETAINING VALVES
Filed March 12, 1934  2 Sheets-Sheet 2
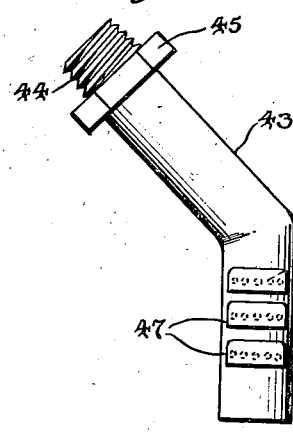
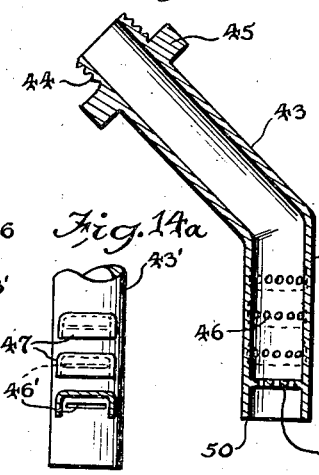
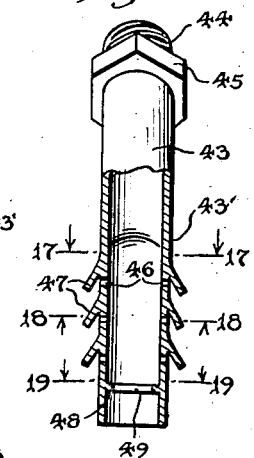
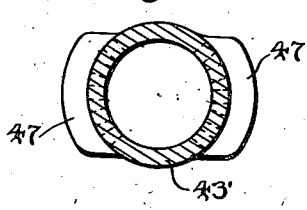
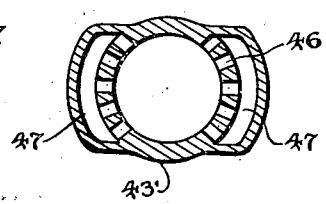
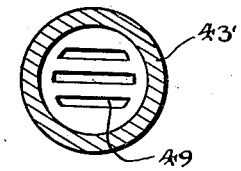
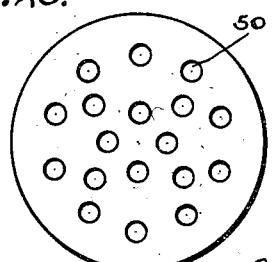
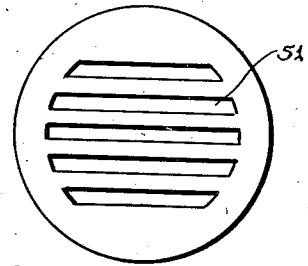
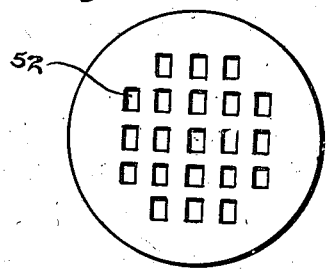
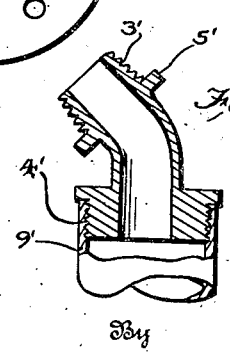
Inventor
Sylvester L. Joiner,
By Luke A. Mattare
Attorney Patented May 25, 1937

2,081,457

UNITED STATES PATENT OFFICE 2,081,457

ATTACHMENT FOR AIR BRAKE PRESSURE RETAINING VALVES

Sylvester L. Joiner, Sweetwater, Tex., assignor to The Westinghouse Air Brake Company, Wilmerding, Pa., a corporation of Pennsylvania Application March 12, 1934, Serial No. 715,189

17 Claims. (Cl. 303—1)

This invention relates to an attachment for pressure retaining valves, and more particularly to an attachment for pressure retaining valves of air braking systems on railroad freight and passenger cars.

It is known to those skilled in the art that the pressure retaining valves or so called triple valves of an air braking system for railroad cars are provided with an exhaust port for exhausting air through and out of said port to the atmosphere each time the brakes of the cars are released, and that it is absolutely necessary that the said exhaust port be open at all times to permit such exhaust of air from the air braking system through the exhaust port in the retaining valve to the atmosphere each time the brakes are released. It is also well known to those familiar with air braking equipment for railroad cars that the exhaust ports of the pressure retaining valves frequently become stopped or clogged up thereby preventing proper exhaust of air from the air braking system through the pressure retaining valve exhaust port to the atmosphere, and preventing proper actuation of the braking system causing locking of and sliding of the car wheels on the rails and consequently flattening a portion of the periphery of the car wheels and also causing damage to the brake beams, etc., of the railroad car, and possibly causing more serious accidents, delay, etc.

The exhaust ports of the pressure retaining or triple valves become stopped up by insects depositing solid matter therein, and also by the formation of ice in the winter months, and by various other ways and means.

The present invention, as before stated consists of a device in the form of an attachment that may readily be applied to or connected with the exhaust port of a pressure retaining or triple valve so it will be a certainty that the exhaust air from the triple valve will properly exhaust to the atmosphere at any and all times and under all conditions and circumstances, as required.

One object of the invention is to provide a device in the form of an attachment of simple, inexpensive, durable construction that can be readily connected to or associated with the exhaust port of the pressure retaining or triple valve by any ordinary person and not requiring the services of a trained or experienced expert or mechanician well versed in air braking equipment for railroad cars.

Another object of the invention is to provide a device which will positively prevent stopping up of the same so as to prevent proper exhausting of the exhaust air to the atmosphere, by insects, or by the formation of ice, or by any other ways or means.

A further object is to provide a device which will prevent rain, water or moisture, etc. from other sources entering the same and in cold weather freezing therein and/or causing rust to form therein, and yet allow a perfect discharge of the exhaust air to the atmosphere at any and all times and under all circumstances and weather conditions.

To the accomplishment of the foregoing and such other objects as may hereinafter appear, this invention consists in the construction, combination and arrangement of parts hereinafter described and then sought to be defined in the appended claims, reference being had to the accompanying drawings which show, merely for the purpose of illustrative disclosure, several embodiments of this invention, including modifications, it being expressly understood, however, that various changes may be made in practice within the scope of the claims without digressing from my inventive idea.

In the drawings:—

Figure 1 is a side elevational view showing one form of my device attached to the exhaust port of a standard pressure retaining or triple valve.

Fig. 2 is a vertical cross-sectional view of the device shown in Fig. 1.

Fig. 3 is a transverse section taken on the lines 3—3 of Fig. 2.

Fig. 4 is a transverse section taken on the lines 4—4, of Fig. 2, looking in the direction of the arrows.

Fig. 5 is a transverse section taken on the lines 5—5 of Fig. 2, looking in the direction of the arrows.

Fig. 6 is a vertical cross-sectional view of a modification of the invention.

Fig. 7 is a transverse sectional view taken on the lines 7—7 of Fig. 6, looking in the direction of the arrows.

Fig. 8 is a vertical cross-sectional view of another modification of the invention.

Fig. 9 is a transverse section taken on the lines 9—9 of Fig. 8.

Fig. 10 is a transverse section taken on the lines 10—10 of Fig. 8.

Fig. 11 is still another modification of the invention in vertical cross-section.

Fig. 12 is a transverse section taken on the lines 12—12 of Fig. 11, looking in the direction of the arrows.

Fig. 13 is a transverse section taken on the lines 13—13 of Fig. 11, looking in the direction of the arrows.

Fig. 14 is a side elevational view of a further modification of the invention.

Fig. 14a is a fragmentary side elevation of another slight modification of the invention.

Fig. 15 is a vertical cross-section of the device shown in Fig. 14.

Fig. 16 is a front view, partly in section, of the device shown in Fig. 14.

Figs. 17, 18 and 19 are transverse sections taken on the lines 17—17, 18—18 and 19—19 respectively of Fig. 16.

Figs. 20, 21 and 22 are top plan views showing modifications of and arrangement of various openings which may be used in connection with the various devices shown in the other figures of the drawings.

Fig. 23 is a still further modification of the invention in vertical cross-section.

Referring more particularly to the drawings, Figs. 1, 2, 3, 4 and 5, *a* denotes the usual air brake pressure retaining or triple valve, *b* the inlet for the air pressure to the valve and *c* the exhaust port through which the air is exhausted. My invention indicated by the numeral 1 is shown as attached to the exhaust port *c* of the valve *b*. The device 1 is preferably entirely of metal, although other material may be used, and may be cast or molded or formed in any other advantageous manner, and consists of a one-piece hollow preferably cylindrical, interior nipple 2, which acts as a baffle, having an exteriorly screw-threaded end portion 3, and an exteriorly screw-threaded intermediate portion 4 separated by the enlarged polygonal wrench engaging portion 5 and a relatively long body or extension 6 provided with a plurality of narrow openings or slots 7 which extend along and through the body longitudinally and also through the closed end radially to the center 8.

A hollow cover or weather protector member 9, also preferably of cylindrical formation, having an open end 10, interiorly screw threaded at 11 and a closed end provided with a plurality of relatively narrow openings or slots 12, which closed end is spaced from the closed end 8 of the nipple 2 and the cover is of dimensions so as to enclose and also be spaced from the body of the nipple 2. The protector 9, is attached by means of the interior screw threads 11 to the exterior screw threads 4 and in tight engagement with one side of the polygonal portion 5 as clearly shown in Fig. 2. The cover or protector member 9 adjacent the open end 10 is provided with a plurality of longitudinally extending raised ribs 13, or of any other suitable irregular formation, to permit its engagement with a wrench or other suitable tool so that it can be associated with the nipple 2, as shown. While I have shown the closed end of the cover 9 provided with slots 12, it is to be distinctly understood that the said closed end can be entirely eliminated and the end of the cover can be left entirely open, and the device will function properly.

Therefore, it will be seen that by providing a device as shown in Figs. 1 to 5, inclusive, and with the device assembled as shown in Figs. 1 and 2, the said device may be attached to the exhaust port *c* of the pressure retaining valve by simply inserting the exteriorly screw-threaded end 3 thereof into relationship with the interior screw-threads in the exhaust port *c* and by applying a wrench or other suitable tool to the polygonal portion 5 the device may as a whole be turned home into secure relationship with the pressure retaining valve as shown in Fig. 1. The relatively long openings or slots 7 in the nipple 2 will allow the exhaust air to escape therethrough into the interior of the cover or protector 9 and out through the slots 12, or the open end, as the case may be, to the atmosphere, and such a construction and arrangement will absolutely prevent clogging up of the slots 7 by foreign matter from any source, and will also likewise prevent rain water, etc. from entering and rust forming in said slots and becoming frozen therein in the winter months. As shown in Fig. 1, the device is disposed at an incline when attached to the pressure retaining valve.

In Figs. 6 and 7 there is shown an embodiment of the present invention, which is somewhat similar to the invention as described in connection with Figs. 1 to 5, inclusive, but, eliminating the body portion 6 of the nipple 2 as shown in Figs. 1 to 5, inclusive. This device consists of a relatively short hollow nipple 15 provided with exterior screw threads 16 at one end and exterior screw threads 17 at its other end intermediate of which screw threads there is a polygonally formed portion 19. The polygonal portion 19 is under-cut or beveled on one side at 20 adjacent the screw-threads 17, and is adapted to receive in said under-cut the tapered or beveled outermost end 21 of a hollow body, or nipple 22. The other end of the hollow body, which is preferably of cylindrical formation, but which may be of any desired shape, is open at its other end 23, and spaced inwardly from said open end 23 there is provided a fixed integral partition or baffle 24, which partition 24 is formed with a plurality of openings or slots 25. The body 22 is provided exteriorly adjacent its end 21 with a plurality of raised ribs or projections 26, or any other irregular or polygonal formation so that it may be engaged by a wrench or other suitable tool to enable the same to be tightly associated with the nipple 15 seating the end of the body 21 forcibly in the under-cut portion 20 of the said nipple and forming a water-tight and leak-proof connection therewith.

The device shown in Figs. 6 and 7 is, of course, adapted to be assembled as shown and by simply applying a wrench to the polygonal portion 19 of the nipple it can be securely associated by means of the screw threaded end 16 with the exhaust port *c* of the pressure retaining valve *a*, the same as hereinbefore explained with regard to Figs. 1 to 5, inclusive. The exhaust air from the pressure retaining valve will exhaust through the hollow nipple 15, through the body 22 and through and out past the openings or slots 25 in the partition 24, past the end 23 of the nipple or body to the atmosphere. By placing the partition or baffle inwardly of the open end 23 of the nipple or body 22, it will be seen that the openings or slots in the partition are protected from the elements of rain or other foreign matter entering said openings or slots and thereby clogging up of the same, and a proper exhaust of air to the atmosphere is assured, under any and all circumstances and conditions, etc.

In Figs. 8, 9 and 10, another embodiment of the present invention is shown which consists of a hollow nipple 28 with an inclined or angular portion 28' exteriorly screw-threaded at one end at 29, adjacent which screw threads there is provided a polygonal wrench engaging portion 30, and interiorly screw-threaded at 31 at its other end, which other end 31, as will be seen is vertically disposed when the device is attached to the pressure retaining valve.

A hollow flared attachment 32 having an exteriorly screw-threaded reduced end 32', and its other or enlarged end 33 open is adapted to be associated with the vertically disposed portion 31' of the nipple 28 by means of engaging the exteriorly threaded reduced end 32' of the attachment 32 with the interiorly screw-threaded portion 31 of the nipple portion 31' as shown. Intermediate the ends of, and interiorly of the attachment 32 a fixed partition, or baffle, 34 is formed, which fixed partition is provided with a plurality of openings 34' to allow escape of exhaust air therethrough and to the atmosphere. The screw-threaded end 29, of course, is adapted to be associated with the exhaust port of the pressure retaining valve in precisely the same manner, as hereinbefore described with regard to Figs. 1 to 7, inclusive.

In Figs. 11, 12 and 13 another modification of the invention is shown and it is very similar to the invention as disclosed and described with regard to Fig. 6, except that in Fig. 6 the device is in two parts whereas in Figs. 11, 12 and 13 the device is a single element, of one-piece construction.

The device in Figs. 11, 12 and 13 consists of a hollow, preferably cylindrical, nipple 36 having a reduced exteriorly screw-threaded end 37, adjacent which there is an enlarged polygonal wrench engaging portion 38, and having its other end 39 open. Interiorly of the nipple 36 and spaced inwardly of the open end 39 thereof, a fixed partition, or baffle, 40 is formed, which partition 40 is provided with a plurality of openings or slots 40' to allow escape of exhaust air to the atmosphere. The device in Figs. 11, 12 and 13 is attachable to the exhaust port of the pressure retaining valve precisely as, and functions precisely the same as hereinbefore described with respect to Figs. 1 to 10, inclusive.

In Figs. 14 to 19, inclusive, a still further modification of the present invention is shown, which consists of a hollow nipple, preferably round, having an angular portion 43 and a vertical portion 43'. The angular portion is exteriorly screw-threaded at 44 at its end and adjacent said screw-threaded end there is an enlarged polygonally formed wrench engaging portion 45. The vertical portion 43' of the nipple at diametrically opposite points is provided with a plurality of circumferential openings 46 which may be circular holes as shown in Figs. 14 to 18, inclusive, or such openings may be in the form of relatively narrow slots 46' which extend around and through diametrically opposite portions of the circumference of the nipple portion 43' as shown in Fig. 14a.

Three sets of openings 46 and 46' are shown in diametrically opposite sides of the nipple in superimposed relation, and it is to be understood that one or more sets of such openings may be used, as desired. All of the openings 46 and 46' are protected against the elements by integrally formed hoods or protectors 47 which project over and are spaced from said openings, and which hoods are inclined downwardly and outwardly, as shown, to shed water, etc. away from and prevent its entrance into said openings. A fixed partition, or baffle 48 provided with a plurality of openings or slots 49 is disposed interiorly of and inwardly of the open end 50 of the nipple. The device is attachable to the exhaust port of the retaining valve, as hereinbefore described with regard to the other figure of the drawings, and the exhaust air passes through the hollow nipple and out of the openings 46 and 46', also through the openings 49 in the partition 48 to the atmosphere.

In Figures 20, 21 and 22 there are shown various shapes of openings which may be substituted, or used in place of the openings 12 in Fig. 1; or for the openings 25 in the partition 24 in Figs. 6 and 7; or for the openings 34' shown in Figs. 8, 9 and 10; or for the openings 40' shown in Figs. 11, 12 and 13; or for the openings 49 shown in Figs. 14 to 18, inclusive.

In Fig. 20, the plurality of openings 50 are merely circular, and any number and arrangement of such openings may be provided. In Fig. 21, the openings 51 are in the form of a plurality of elongated narrow slots and any number and arrangement of such slots may be used. In Fig. 22, the plurality of openings 52 are of rectangular formation, and any number and arrangement of such openings may be used, as desired. I have merely given a showing of several shapes of openings which may be used by way of example, and it is to be understood that such shapes of openings, as shown, and described may be used, but, I do not want it understood that I am limited to the shape and arrangement of openings, as obviously, various other shapes and arrangements of openings may be employed.

In Fig. 23, I have shown a further modification of Figs. 1 to 7, inclusive, and Figs. 11, 12 and 13, whereby, the device instead of being angularly disposed, or disposed at an incline as shown in Fig. 1, when attached to the exhaust port of the pressure retaining valve, will be vertically disposed substantially as shown in the device as shown in Figs. 8, 9 and 10, inclusive, and Figs. 14 to 19, inclusive.

In other words, the screw-threaded end 3 in Fig. 1; the screw-threaded end 16 in Fig. 6; and the screw-threaded end 37 in Fig. 11 will be angularly disposed as shown in Fig. 23. In Fig. 23, the exteriorly screw-threaded end 3' is disposed at an angle and adjacent the said screw-threads an enlarged polygonal wrench engaging portion, is provided, below which other exterior screw-threads 4' are formed. The device, in Fig. 23, otherwise, may embody the construction shown in Fig. 2; Fig. 6 and Fig. 11, and it will be seen that when the exterior screw-threads 3' are associated with the interior screw-threads in the exhaust port, the nipple or protector member 9' will be vertically disposed with respect to the pressure retaining valve, when in use.

The various partitions, or baffles hereinbefore mentioned may be made integral with the body or nipple, as shown, or such partitions or baffles may be in the form of disks, or of any other desired outline, and inserted in the body or nipple and secured thereto as by welding, or by any other desirable means.

It is also to be understood that the principles of my invention shown in Figs. 14 to 19, inclusive, may be used in a non-angled, or straight nipple according to the teachings in Figs. 1 and 2.

The device shown in the drawings and described herein may be molded or cast of metal or other suitable material, or may be made in any other desired advantageous manner. One of the underlying features of the present invention is to provide a simple device wherein the exhaust air from the pressure retaining valve exhaust port is discharged inwardly of the outer or exposed ends of the devices, so to speak, by means of the said fixed or integral baffles or partitions; the stationary slotted nipple, which acts as a baffle, and the openings 46, and 46' when used, permitting a perfect discharge of said exhaust air to the atmosphere, yet, positively preventing clogging or stopping up of the openings in the various modifications of the invention by foreign matter from any source, or by rain, water, or moisture from any source entering the said devices, causing the same to rust and in winter freezing therein.

I claim:—

1. A device adapted for attachment with the exhaust port of an air brake pressure retaining valve device or the like consisting of a relatively long hollow nipple one end of which is to be attached to the said exhaust port and project a substantial distance therebeyond, the said nipple being provided throughout a substantial portion of its length with a plurality of openings in the form of relatively long narrow slots, through which slots exhaust air and/or other foreign matter is discharged to the atmosphere, and means secured to said nipple over said openings forming a chamber open to said openings and open, at one end only, to the atmosphere and through which fluid under pressure issuing from said openings escapes to the atmosphere, said means acting to prevent foreign matter from the atmosphere entering said openings.

2. A device as defined in claim 1, wherein the means secured to the nipple over the openings is in the form of a weather cover or protector which surrounds substantially the entire nipple and is in spaced relation thereto, whereby the exhaust air and/or other foreign matter issuing from the slots in the nipple will discharge into the said protector and then to the atmosphere, and water and other foreign matter will be prevented from entering and stopping up the said slots by means of the said protector.

3. The combination with an air brake pressure retaining valve device or the like having an air exhaust port, of a hollow nipple having one end thereof associated with or attached to said port and extending outwardly therefrom, the other end of said nipple being open, a stationary partition or baffle disposed interiorly of the nipple and spaced inwardly from the said open end of the nipple, the said partition or baffle being provided with a plurality of openings of a character so as to prevent insects from entering and depositing solid matter therein, and the partition or baffle being so spaced inwardly of the said open end as will prevent foreign matter such as dirt, dust, water, moisture from collecting, entering or contacting therewith and thereby preventing clogging up of said openings so that a proper discharge of exhaust air and/or other foreign matter through the nipple and the said openings, past the said open end to the atmosphere is assured at all times.

4. A device as defined in claim 3, wherein the said openings are in the form of a plurality of relatively narrow slots.

5. A device of the character described comprising a relatively short hollow nipple exteriorly screw-threaded at both of its ends, and intermediate of which screw-threads there is an enlarged polygonal portion, which polygonal portion is under-cut, a hollow body portion having an open free end and the other end of which is tapered sharply and provided with interior screw-threads adapted to receive therein one screw-threaded end of said nipple adjacent which screw-threads the under-cut is formed in the said polygonal portion so that when assembled the tapered portion of the body will seat in the under-cut in the polygonal portion, and a stationary partition or baffle provided with openings arranged interiorly of the nipple and spaced inwardly of the said open free end of the said body whereby exhaust air can pass through the said hollow nipple through the said openings and past the said open free end of the body to the atmosphere.

6. A device adapted for attachment with the exhaust port of an air brake pressure retaining valve device or the like consisting of a relatively long hollow nipple, the nipple having a substantially closed end and provided adjacent the other end with inner and outward exterior screw-threads intermediate of which there is a polygonally formed tool engaging portion, the outward screw-threads forming a means of attachment of the nipple to the exhaust port of the pressure retaining valve, the nipple also having a plurality of relatively long narrow slots throughout a substantial portion of its length, the said slots extending through the substantially closed end radially to a point at the center thereof, a weather cover or protector for the nipple, the said protector having its inner end interiorly screw-threaded to engage the inner exterior screw-threads of the nipple and its outer end provided with openings and surrounding the slotted portion of the nipple in spaced relation thereto and spaced from the openings in the outer end of the nipple.

7. An attachment for air brake pressure retaining valve device or the like comprising a hollow nipple having an angular portion and a substantially vertical portion, the vertical portion being open at its free end, and said angular portion being adapted to be attached to the exhaust port of said valve, a stationary partition or baffle provided with a plurality of unobstructed openings of a character so as to prevent insects from entering and depositing solid matter therein, said partition or baffle being disposed interiorly of and spaced inwardly of the said open free end of said nipple, the vertical portion of said nipple having a plurality of openings formed in diametrically opposite sides thereof, and hoods or protectors arranged in spaced relation over the openings in said vertical portion.

8. An exhaust fitting for the exhaust port of a fluid pressure brake device or the like comprising an element adapted to be attached to said device and to extend outwardly therefrom and having at least one relatively small opening through which fluid under pressure from said exhaust port is adapted to escape, and means associated with said element forming a chamber open to said opening and also open directly to the atmosphere in a generally downwardly direction forming a relatively large vent communication to the atmosphere for fluid under pressure issuing from said relatively small opening, said means acting to keep foreign matter in the atmosphere away from said relatively small opening.

9. An exhaust fitting for the exhaust port of a fluid pressure brake device or the like comprising an element adapted to be attached to said device and to extend outwardly therefrom and having at least one relatively small opening in the side wall thereof through which fluid under pressure from said exhaust port is adapted to escape, and means associated with said element forming a chamber open to said opening and also open directly to the atmosphere in a generally downwardly direction forming a relatively large vent communication to the atmosphere for fluid under pressure issuing from said relatively small opening, said means acting to keep foreign matter in the atmosphere away from said relatively small opening.

10. An exhaust fitting for the exhaust port of a fluid pressure brake device or the like comprising an element adapted to be attached to said device and to extend outwardly therefrom and having at least one relatively small opening in the outer end thereof through which fluid under pressure from said exhaust port is adapted to escape, and means associated with said element forming a chamber open to said opening and also open directly to the atmosphere in a generally downwardly direction forming a relatively large vent communication to the atmosphere for fluid under pressure issuing from said relatively small opening, said means acting to keep foreign matter in the atmosphere away from said relatively small opening.

11. An exhaust fitting for the exhaust port of a fluid pressure brake device or the like comprising an element adapted to be attached to said device and to extend outwardly therefrom and having a plurality of relatively small openings in the side and outer end wall thereof through which fluid under pressure from said exhaust port is adapted to escape to the atmosphere, and means associated with said element extending over said openings and establishing relatively large communication from said openings to the atmosphere in a generally downwardly direction, said means acting to keep foreign matter in the atmosphere away from said relatively small openings.

12. An exhaust fitting for the exhaust port of a fluid pressure brake device or the like comprising an element adapted to be attached to said device and to extend outwardly therefrom, said element forming a partition between said exhaust port and atmosphere and having a plurality of relatively narrow slots throughout a portion of its length through which fluid under pressure from said exhaust port is adapted to escape to the atmosphere, and means associated with said element and spaced therefrom and surrounding said slots and open to the atmosphere only at its lower end through a relatively large opening whereby fluid under pressure issuing from said slots escapes to the atmosphere, said means extending sufficiently below said slots to keep foreign matter in the atmosphere away from said slots.

13. An exhaust fitting for the exhaust port of a fluid pressure brake device or the like comprising an element adapted to be attached to said device and to extend outwardly therefrom, said element forming a partition between said exhaust port and atmosphere and having a plurality of relatively narrow slots throughout a portion of its length through which fluid under pressure from said exhaust port is adapted to escape to the atmosphere, and means associated with said element and spaced therefrom and surrounding said slots and open to the atmosphere only at its lower end through a relatively large opening whereby fluid under pressure issuing from said slots escapes to the atmosphere, said means extending sufficiently below said slots to keep foreign matter in the atmosphere away from said slots, said means being secured to said element by screw-threaded engagement whereby said means is removable from said element.

14. An exhaust fitting for the exhaust port of a fluid pressure brake device or the like comprising a hollow tubelike element having a screw-threaded end for attachment to the device whereby said exhaust port is placed in communication with the chamber within said element, and the other end of said element being open to the atmosphere in a generally downwardly direction, a partition wall in said chamber between said exhaust port and atmosphere and having a plurality of relatively small openings through which fluid under pressure issuing from said exhaust port is adapted to escape to the atmosphere, said partition wall being spaced inwardly from the atmospheric end of said chamber a distance sufficient to prevent foreign matter in the atmosphere from clogging said openings.

15. An exhaust fitting for the exhaust port of a fluid pressure brake device or the like comprising a hollow tubelike element having a screw-threaded end for attachment to the device whereby said exhaust port is placed in communication with the chamber within said element, and the other end of said element being open to the atmosphere in a generally downwardly direction, a partition wall in said chamber between said exhaust port and atmosphere and having a plurality of relatively small openings through which fluid under pressure issuing from said exhaust port is adapted to escape to the atmosphere, said partition wall being spaced inwardly from the atmospheric end of said chamber a distance sufficient to prevent foreign matter in the atmosphere from clogging said openings, the screw-threaded portion of said element and the portion containing said partition wall being separate elements secured together.

16. An exhaust fitting for the exhaust port of a fluid pressure brake device or the like comprising a hollow tubelike element having a screw-threaded end for attachment to the device whereby said exhaust port is placed in communication with the chamber within said element, and the other end of said element being open to the atmosphere in a generally downwardly direction, a partition wall in said chamber between said exhaust port and atmosphere and having a plurality of relatively small openings through which fluid under pressure issuing from said exhaust port is adapted to escape to the atmosphere, said partition wall being spaced inwardly from the atmospheric end of said chamber a distance sufficient to prevent foreign matter in the atmosphere from clogging said openings, the outer portion of said element being flared to provide a greater cross-sectional area of opening to the atmosphere than at the inner portion where attached to the device.

17. An exhaust fitting for the exhaust port of a fluid pressure brake device or the like comprising a hollow element having a screw-threaded end for attachment to the device and through which communication is established from said port to the chamber within said element, said chamber being open at its lowermost portion to the atmosphere, said fitting further comprising a partition wall in said chamber between said exhaust port and atmosphere and having a plurality of relatively small openings through which fluid under pressure issuing from said exhaust port to one side of said partition wall escapes to the other side thereof and from thence to the atmosphere, said partition wall being spaced inwardly from the open end of said chamber a distance sufficient to prevent foreign matter in the atmosphere clogging said openings.

SYLVESTER L. JOINER.